US012024948B2

(12) United States Patent
Tomczyk

(10) Patent No.: US 12,024,948 B2
(45) Date of Patent: Jul. 2, 2024

(54) SYSTEMS AND METHODS FOR CONTROLLING AN ELECTROSTATIC SHUTTER

(71) Applicant: Pella Corporation, Pella, IA (US)

(72) Inventor: Sebastian Tomasz Tomczyk, Otley, IA (US)

(73) Assignee: Pella Corporation, Pella, IA (US)

( * ) Notice: Subject to any disclaimer, the term of this patent is extended or adjusted under 35 U.S.C. 154(b) by 214 days.

(21) Appl. No.: 17/193,037

(22) Filed: Mar. 5, 2021

(65) Prior Publication Data

US 2021/0285280 A1 Sep. 16, 2021

Related U.S. Application Data

(60) Provisional application No. 62/987,466, filed on Mar. 10, 2020.

(51) Int. Cl.
*E06B 9/68* (2006.01)
*E06B 9/42* (2006.01)

(52) U.S. Cl.
CPC .................. *E06B 9/68* (2013.01); *E06B 9/42* (2013.01); *E06B 2009/6809* (2013.01); *E06B 2009/6845* (2013.01)

(58) Field of Classification Search
CPC ...... E06B 2009/6845; E06B 9/68; E06B 9/42; E06B 2009/6809; E06B 2009/2464; E06B 2009/2643; E06B 2009/6818
See application file for complete search history.

(56) References Cited

U.S. PATENT DOCUMENTS

| | | | |
|---|---|---|---|
| 3,989,357 | A | 11/1976 | Kalt |
| 4,105,294 | A | 8/1978 | Peck |
| 4,248,501 | A | 2/1981 | Simpson |
| 4,266,339 | A | 5/1981 | Kalt |
| 4,644,755 | A | 2/1987 | Esslinger et al. |
| 5,233,459 | A | 8/1993 | Bozler et al. |
| 6,369,530 | B2 | 4/2002 | Kovach et al. |
| 6,692,646 | B2 | 2/2004 | Kalt et al. |
| 6,771,237 | B1 | 8/2004 | Kalt |
| 6,897,786 | B1 | 5/2005 | Kalt et al. |

(Continued)

FOREIGN PATENT DOCUMENTS

| | | | |
|---|---|---|---|
| AU | 727009 | B2 | 11/2000 |
| AU | 2012275383 | A1 | 1/2014 |

(Continued)

*Primary Examiner* — Johnnie A. Shablack
*Assistant Examiner* — John W Hanes, Jr.
(74) *Attorney, Agent, or Firm* — Armstrong Teasdale LLP

(57) ABSTRACT

Disclosed herein is an electrostatic shutter system including an electrostatic shutter configured to be selectively raised and lowered based on a voltage applied to the electrostatic shutter, at least one sensor system configured to detect a position of the electrostatic shutter, and a controller communicatively coupled to the electrostatic shutter and the at least one sensor system. The controller is configured to apply an initial voltage to the electrostatic shutter to lower the electrostatic shutter, receive an output signal from the at least one sensor indicating the electrostatic shutter has reached a predetermined position, and based on the received output signal from the at least one sensor, apply an updated voltage to the electrostatic shutter to hold the shutter at the predetermined position.

20 Claims, 5 Drawing Sheets

(56) References Cited

U.S. PATENT DOCUMENTS

| | | | | |
|---|---|---|---|---|
| 7,215,357 | B1 | 5/2007 | Swift et al. | |
| 7,583,086 | B2 * | 9/2009 | Yasuda | G01R 29/12 324/458 |
| 7,645,977 | B2 | 1/2010 | Schlam et al. | |
| 7,684,105 | B2 | 3/2010 | Lamontagne et al. | |
| 7,705,826 | B2 | 4/2010 | Kalt et al. | |
| 8,197,093 | B2 | 6/2012 | Veskovic | |
| 8,736,938 | B1 | 5/2014 | Schlam et al. | |
| 9,279,729 | B2 | 3/2016 | Nakamura et al. | |
| 9,539,883 | B2 | 1/2017 | Snider et al. | |
| 9,938,765 | B2 | 4/2018 | Berman et al. | |
| 10,035,019 | B2 | 7/2018 | Wolf | |
| 10,526,837 | B2 | 1/2020 | Jao et al. | |
| 2006/0000558 | A1 | 1/2006 | Fennell | |
| 2014/0175281 | A1 | 6/2014 | Reynolds et al. | |
| 2014/0202643 | A1 | 7/2014 | Hikmet et al. | |
| 2014/0268296 | A1 | 9/2014 | Schlam et al. | |
| 2014/0338846 | A1 | 11/2014 | Hikmet et al. | |
| 2016/0348430 | A1 * | 12/2016 | Lorenzani | E06B 9/68 |
| 2018/0181085 | A1 | 6/2018 | Gabriel et al. | |
| 2019/0086731 | A1 | 3/2019 | Schlam et al. | |
| 2019/0171081 | A1 | 6/2019 | Zedlitz et al. | |
| 2019/0257686 | A1 | 8/2019 | Popat | |
| 2019/0264487 | A1 * | 8/2019 | Zanolari | G01V 8/20 |
| 2019/0331978 | A1 * | 10/2019 | Shrivastava | G02F 1/161 |
| 2021/0238913 | A1 * | 8/2021 | Koskulics | B32B 17/10201 |
| 2021/0238921 | A1 * | 8/2021 | Gu | B32B 17/10036 |

FOREIGN PATENT DOCUMENTS

| | | | |
|---|---|---|---|
| AU | 2015203820 | B2 | 3/2017 |
| AU | 2017279702 | A1 | 7/2018 |
| AU | 2018214092 | A1 | 3/2019 |
| CA | 1244905 | A1 | 11/1988 |
| CA | 2369364 | A1 | 10/2000 |
| CA | 3025827 | A1 | 12/2017 |
| CN | 203487967 | U | 3/2014 |
| CN | 104295187 | A | 1/2015 |
| CN | 206186754 | U | 5/2017 |
| CN | 206267767 | U | 6/2017 |
| CN | 110005328 | A | 7/2019 |
| KR | 1729370 | B1 | 4/2017 |
| MX | 2005013605 | A | 3/2006 |
| WO | 20120177995 | A1 | 12/2012 |

* cited by examiner

SYSTEMS AND METHODS FOR CONTROLLING AN ELECTROSTATIC SHUTTER

CROSS-REFERENCE TO RELATED APPLICATIONS

This application claims priority to U.S. Provisional Application No. 62/987,466 filed on Mar. 10, 2020, which is incorporated by reference herein in its entirety.

FIELD OF THE DISCLOSURE

The present disclosure relates to a controller for an electrostatic shutter, and more particularly, a controller for controlling the position and motion of an electrostatic shutter.

BACKGROUND

At least some known electrostatic windows include a positionable shutter that may be selectively rolled up in a stowed position or unfurled such that the shutter blocks or prevents radiation, e.g., sunlight, from entering through the window. Generally, a voltage is applied to the electrostatic window to create an electrostatic force that causes the shutter to unfurl. When the voltage is removed, the shutter rolls back up into the stowed position.

At least some known electrostatic windows utilize a controller to selectively switch on or switch off the applied voltage. For example, the controller may switch on a voltage supply to the electrostatic window system causing the shutter to unfurl completely. Likewise, the controller may switch off the voltage supply, causing the shutter to roll back up into the stowed position. When the applied voltage is removed, the material properties and dimensions of the shutter cause the shutter to roll upward into the stowed position. For example, the shutter may be suitably biased such that unrolling the shutter stores a tension in the shutter. After the controller switches off the applied voltage, the tension stored in the shutter causes the shutter to recoil to the rolled up position. The material properties of the shutter may affect the rolling and unrolling of the shutter.

In some cases, environmental factors, e.g., ambient temperature, fatigue, and/or age of the shutter may affect the material properties of the shutter. As such, the applied voltage may not completely unroll the shutter. For example, in some cases, if the stiffness of the shutter is increased, the applied voltage may not generate a sufficient electrostatic force to completely unfurl the shutter. Further, it may be advantageous to unroll the shutter to multiple different positions between a rolled up position and a completely unfurled position, to provide additional control over the amount of radiance that passes through the window.

Accordingly, it may be advantageous to precisely control the position and motion of an electrostatic shutter.

SUMMARY

One aspect of the present disclosure is directed toward an electrostatic shutter system. The electrostatic shutter system includes an electrostatic shutter configured to be selectively raised and lowered based on a voltage applied to the electrostatic shutter, at least one sensor configured to detect a position of the electrostatic shutter, and a controller communicatively coupled to the electrostatic shutter and the at least one sensor. The controller is configured to apply an initial voltage to the electrostatic shutter to lower the electrostatic shutter, receive an output signal from the at least one sensor indicating the electrostatic shutter has reached a predetermined position, and based on the received output signal from the at least one sensor, apply an updated voltage to the electrostatic shutter to hold the shutter at the predetermined position.

Yet another aspect of the present disclosure is directed to a control system for positioning an electrostatic shutter. The control system includes at least one sensor configured to detect a position of the electrostatic shutter, and a controller communicatively coupled to the at least one sensor, wherein the controller is configured to control a position of the electrostatic shutter by adjusting a voltage applied to the electrostatic shutter based on signals received from the at least one sensor.

Yet another aspect of the present disclosure is directed a method for positioning an electrostatic shutter. The method includes applying an initial applied voltage to the electrostatic shutter to lower the electrostatic shutter, receiving an output signal from at least one sensor, wherein the at least one sensor detects a position of the shutter, and based on the received output signal, applying an updated applied voltage to the electrostatic shutter to hold the shutter at a predetermined position.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

FIGS. 1-5 illustrate example embodiments of a controller indicated generally at 100 for use with an electrostatic window indicated generally at 200 according to example embodiments of the present disclosure. The electrostatic window 200 includes window 202 and a selectively positionable electrostatic shutter 204. The controller 100 selectively positions the shutter 204 to control the radiance transmittance, e.g., sunlight, passing through the window 202. The electrostatic window 200 and the controller 100 may be used to control radiance transmittance in a variety of implementations, for example and without limitation, a door, a window, a skylight, a moon roof, a canopy, and the like.

Figure 1:
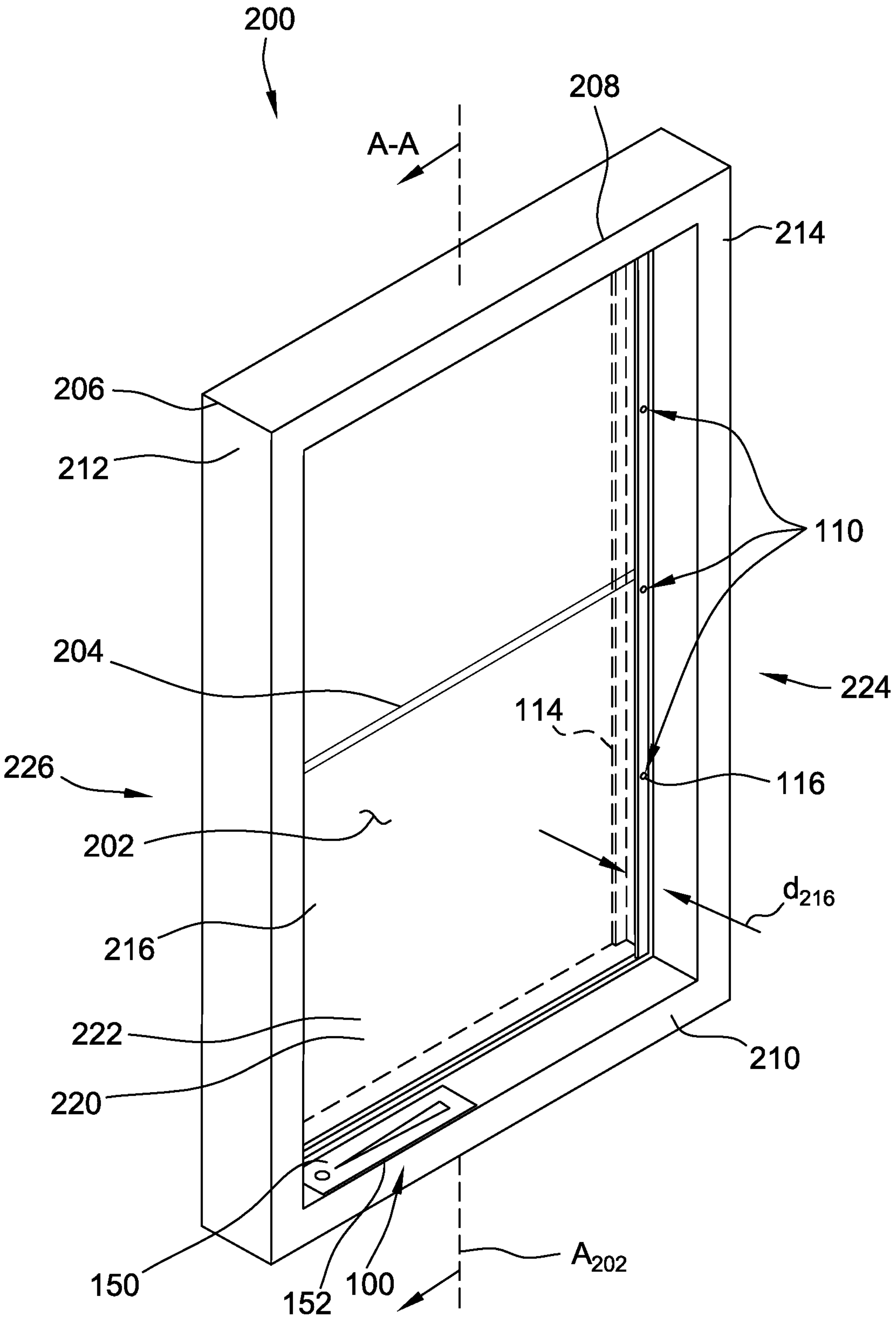
FIG. 1 is a perspective view of an example embodiment of an electrostatic window and a controller for controlling the position of a shutter.
Figure 2:
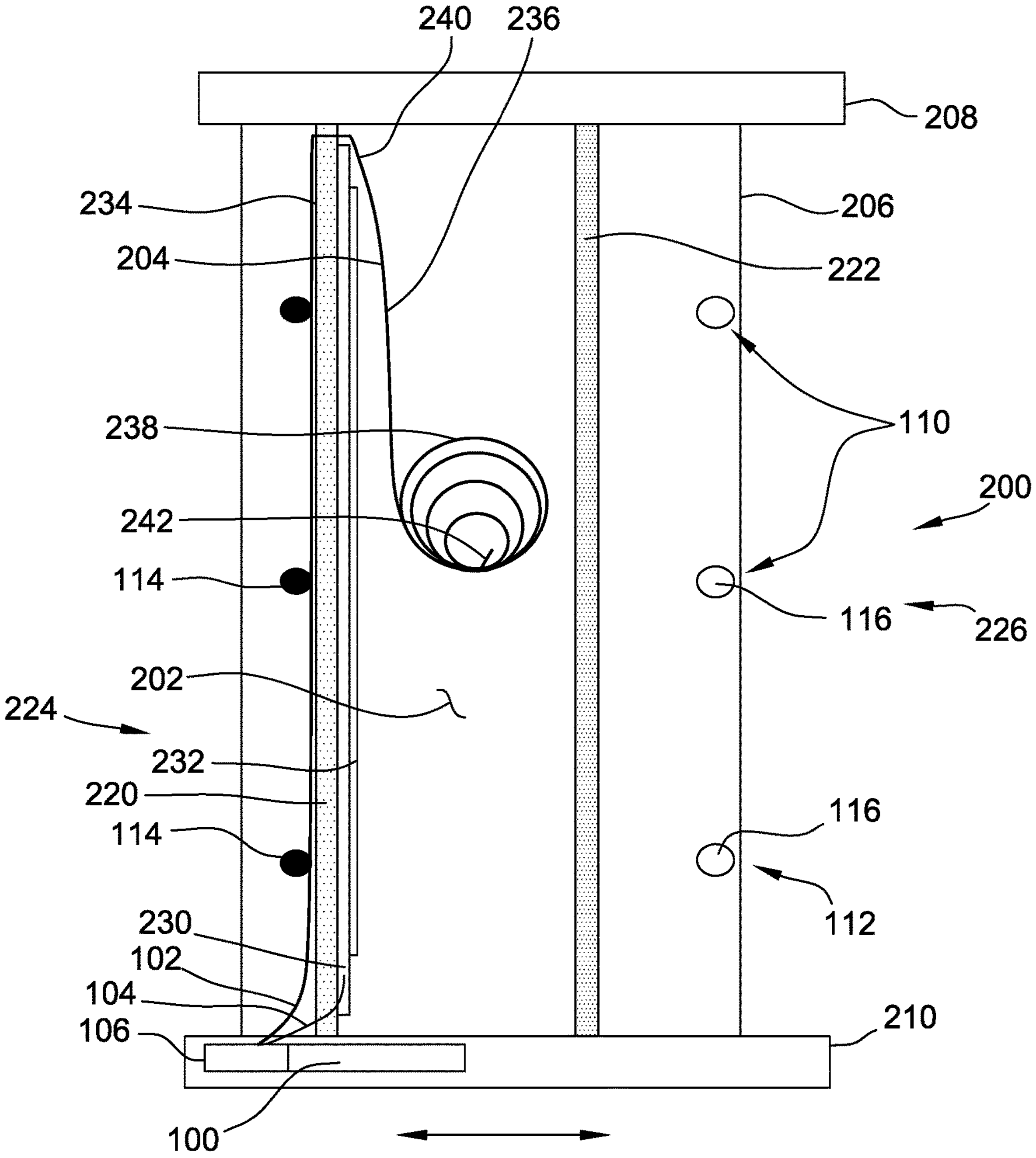
FIG. 2 is a cross-sectional view taken at line A-A shown in FIG. 1.

In reference to FIGS. 1 and 2, the electrostatic window 200 includes a frame 206 that defines a boundary of the window 202. The frame 206 includes a head 208 and a sill 210 and defines a window axis $A_{202}$ that extends therebetween. The head 208 and the sill 210 are generally parallel to each other. The frame 206 further includes a first jamb 212 and a second jamb 214 extending generally parallel to each other between the head 208 and the sill 210.

The window 202 includes a pane unit 216 (e.g., sash) including one or more panes, e.g., glass panes, which are supported by the frame 206. In this illustrated embodiment, the pane unit 216 includes a first pane 220 and a second pane 222 that are both supported by the frame 206. The first pane 220 and the second pane 222 are arranged such that they spaced apart by a distance, $d_{216}$. Additionally, the frame 206 includes a first side 224 and a second side 226. The first side 224 and second side 226 are on opposite sides of the pane unit 216. The first side 224 may be associated with an exterior of the electrostatic window 200, and the second side 226 may be associated with an interior of the electrostatic window 200. For example, the electrostatic window 200 may be mounted to a building such that the first side 224 is exposed to the environment, and the second side 226 is exposed to the interior of a room.

FIG. 2 is a cross-sectional view of the electrostatic window 200 and controller 100 taken along line A-A. In this embodiment, the first pane 220 includes a surface which coated with a pane conductive layer 230. A pane dielectric layer 232 is coated on top of the pane conductive layer 230. Accordingly, the first pane 220 in combination with the pane conductive layer 230 functions as a first electrode 234 that is fixed relative to the frame 206. Alternatively, the first pane 220 may be made of a conductive material (e.g., Indium tin oxide) and serve as the first electrode without using a pane conductive layer 230. Further, in some embodiments, an isolation layer is applied to first pane 220 to separate the first pane 220 and the shutter 204.

In this illustrated embodiment, the shutter 204 is coated with a shutter conductive layer 236. In some other example embodiments, the shutter 204 may be formed of a conductive material. In either configuration, the shutter 204 functions as a second electrode 238 that interacts with first electrode 234 as described herein. The second electrode 238 is a variable position electrode such that at least a portion of the second electrode 238 is moveable relative to the frame 206 and relative to the first electrode 234. The shutter 204 includes a top edge 240 and a bottom edge 242. The shutter 204 may be disposed between the first pane 220 and the second pane 222, and at least a portion of the top edge 240 may be coupled to an isolation layer on the first pane 220.

The shutter 204 may be arranged in a plurality of configurations. In a first configuration (also referred to herein as the stowed position), the shutter 204 is rolled up into a coiled position. Accordingly, when the shutter 204 is in the first configuration, the shutter 204 generally does not block radiance from passing through the window 202, i.e., the shutter 204 is in a stowed position. In some embodiments, when the shutter 204 is rolled up, the shutter 204 may at least partially be covered by the head 208. In addition, when the shutter 204 is rolled up, the top edge 240 and the bottom edge 242 may be arranged in proximity to each other generally near the head 208.

The shutter 204 may be formed of a material configured to block light from passing through the window 202. For example, the shutter 204 may be formed of a polymer material that is substantially opaque. The polymer may be coated with reflective material and/or the shutter conductive layer 236 may itself be reflective. The shutter 204 may be designed to fully or at least partially block or reflect light. In other example embodiments, the shutter 204 may be formed of any material or coated with any material to enable the shutter 204 to function as described herein.

The shutter 204 includes material properties and dimensions that enable the shutter 204 to be arranged in the first configuration absent an applied force. When a force is applied (e.g., an electrostatic force), the shutter 204 may unfurl from the first configuration, such that the bottom edge 242 extends downward along the window axis $A_{202}$ away from the head 208 toward the sill 210, and such that the shutter 204 substantially blocks radiance passing through at least a portion of the window 202.

A first electrical lead 102 couples the first electrode 234 to a voltage source 106, and a second electrical lead 104 couples the second electrode 238 to the voltage source 106. Further, the controller 100 is communicatively coupled to the voltage source 106, and is configured to selectively apply, using the voltage source 106, a voltage difference between the first electrical lead 102 and the second electrical lead 104 to create a corresponding voltage difference between the first electrode 234 and the second electrode 238. The voltage difference creates an attractive force between the first electrode 234 and the second electrode 238 which causes the second electrode 238 to move relative to the first electrode 234. Specifically, the applied voltage difference causes the shutter 204 to unfurl along the window axis $A_{202}$ towards a second configuration, enabling the shutter 204 to at least partially block radiance from passing through the window 202. Likewise, if controller 100 removes the applied voltage, the shutter 204 will recoil and return to the first configuration.

In the embodiment shown in FIG. 2, the controller 100 and the voltage source 106 are positioned in the sill 210. Alternatively, the controller 100 and the voltage source 106 may be positioned at any suitable location within the electrostatic window 200. Further, the controller 100 and the voltage source 106 may be integrated with one another, or may be separate devices.

In the example embodiment, the voltage source supplies a constant voltage (e.g., −300 VDC (Voltage direct current) to the first electrode 234 via the first electrical lead 102, and the voltage supplied to the second electrode 238 via the second electrical lead 104 is varied to control the voltage difference between the first electrode 234 and the second electrode 238. For example, when the constant voltage applied to the first electrode 234 is −300 VDC, the voltage supplied to the second electrode may be varied between −300 VDC and +300 VDC (resulting in a voltage difference varying between 0 VDC and 600 VDC). Those of skill in the art will appreciate that other voltage schemes may be used in other embodiments.

When the controller 100 applies a first voltage difference between the first electrode 234 and the second electrode 238, the shutter 204 may unfurl from the first configuration to the second configuration. In the second configuration, the shutter 204 is in a completely unfurled position. In some example embodiments, when the shutter 204 is in the second configuration, the bottom edge 242 of the shutter 204 is proximate the sill 210. Accordingly, in the second configuration, the shutter 204 generally blocks all radiance from passing through the window 202. Accordingly, the first voltage difference is a voltage difference sufficient to completely unroll the shutter 204. When the controller 100 removes the applied voltage difference, the shutter 204 rolls up again, returning to the first configuration.

The controller 100 may also apply a voltage difference having a magnitude lower than the first voltage difference, in order to hold the shutter 204 at one or more intermediate configurations between the first configuration and the second configuration. In the intermediate configurations, the shutter 204 is partially rolled out and the bottom edge 242 of the shutter 204 is positioned between the head 208 and the sill 210.

The intermediate configurations may include, for example and without limitation, a halfway configuration, a quarter configuration, and/or a three-quarters configuration. In the halfway configuration, the shutter 204 is unrolled out such that the bottom edge 242 of the shutter 204 is disposed approximately halfway between the head 208 and the sill 210. In the quarter configuration, the shutter 204 is unrolled such that the bottom edge 242 of the shutter 204 is disposed approximately a quarter of the way from the head 208 to the sill 210 of the frame 206. Similarly, in the three-quarters configuration, the shutter 204 is rolled out such that the bottom edge 242 of the shutter 204 is disposed approximately three-quarters of the way from the head 208 to the sill 210. Alternatively or additionally, the controller 100 may be configured to position the shutter 204 in any suitable intermediate configuration.

The controller 100 is communicatively coupled to a sensor system 110 that detects and senses the motion and/or position of the shutter 204. The controller 100 receives sensor signals from the sensor system 110 indicating the position of the shutter 204. Based on the sensor signals received from the sensor system 110, the controller 100 transmits signals to the voltage source 106 to control the applied voltage difference between the first electrical lead 102 and the second electrical lead 104, as described above.

The sensor system 110 includes one or more sensors 112 capable of detecting the position and/or motion of the shutter 204. In the example embodiment, each sensor 112 includes at least one transmitter 114 and at least one receiver 116, and the transmitter 114 transmits a sensor signal that is detectable by the receiver 116. The sensor signal detected by the receiver 116 is used to sense the position of the shutter 204. For example, the transmitter 114 may be an infrared (IR) transmitter 114, and the receiver 116 may be an IR receiver 116, with the transmitter 114 emitting an IR sensor signal that is detectable by the receiver 116.

In reference to FIGS. 1 and 2, the transmitter 114 and the receiver 116 are mounted on opposite sides of the pane unit 216. For example, the transmitter 114 and the receiver 116 may be mounted to either the first jamb 212 or the second jamb 214 on opposite sides of the pane unit 216. For example, the transmitter 114 may be mounted on the first side 224, and the receiver 116 may be mounted on the second side 226. Alternatively or additionally, the transmitter 114 may be mounted to the second side 226, and the receiver 116 may be mounted to the first side 224. The transmitter 114 emits a sensor signal that passes through the pane unit 216 and is received by the receiver 116 on the other side of the pane unit 216. The sensor 112 is arranged such that the transmitter 114 directs a sensor signal towards the receiver 116. In this illustrated embodiment, the transmitter 114 and the corresponding receiver 116 are arranged along a line that is perpendicular to the window axis $A_{202}$.

The sensors 112 may be positioned in a plurality of predetermined locations along the window axis $A_{202}$, thereby enabling the sensors 112 to detect the position of the shutter 204 at these predetermined locations. In this illustrated embodiment, the sensor system 110 includes three sensors 112 arranged in three predetermined locations: a first position, a second position, and a third position. The first position is located approximately a quarter of the way from the head 208 to the sill 210. The second position is located at approximately halfway between the head 208 and the sill 210. The third position is located approximately three quarters of the way from the head 208 to the sill 210. In other words, if the shutter 204 is unrolled out to the first position, then approximately a quarter of the window 202 is blocked by the shutter 204. In other example embodiments, the sensor system 110 may include any number of sensors 112 arranged in any number of sensor locations enabling the position of the shutter 204 to be monitored and controlled as described herein.

When the shutter 204 is in the first configuration, the sensor signal emitted by the transmitter 114 is unimpeded by the shutter 204 such that a complete or undisrupted sensor signal is detected by the receiver 116. If the shutter 204 unrolls such that a portion of the shutter 204 is disposed between the transmitter 114 and the receiver 116, the shutter 204 generally blocks or otherwise disrupts the sensor signal. Accordingly, when the shutter 204 is positioned between the transmitter 114 and the receiver 116, the receiver detects an altered sensor signal. The altered sensor signal may include a partial, interrupted, or modified sensor signal.

For example, when the shutter 204 is unfurled halfway between the head 208 and the sill 210, the shutter 204 is disposed between the transmitter 114 and receiver 116 located at the second position. Accordingly, the sensor 112 mounted at the second position detects that the shutter 204 is unfurled at least the second position.

In the example embodiment, the controller 100 is communicatively coupled to a user interface 150. The user interface 150 supports one or more user input devices 152 that transmit sensor signals to the controller 100 to control operation of the shutter 204. User input devices 152 may include knobs, dials, switches, and the like. For example, in one embodiment, the user input devices 152 include a slider that is capable of detecting a user's finger position on the slider using capacitive electrodes. A user may adjust the user input devices 152 in order to select or control one or more operations executed by the controller 100. For example, the user input devices 152 may be used to select a desired position of the shutter 204. For example, a user may adjust the user input device 152 to select that the shutter 204 be unfurled to the first position. In response, the controller 100 may enable the sensors 112 located at the first position and disable the sensors 112 located at other positions, and the controller 100 may transmit a sensor signal to the voltage source to apply a voltage to cause the shutter 204 to unfurl until the sensor 112 located at the first position detects the shutter 204.

The user interface 150 may be coupled to the frame 206. For example, the user interface 150 may be coupled to the first side 224 of the frame 206 such that a user may easily access the user interface 150 and the one or more user input devices 152. Additionally or alternatively, the user interface 150 and user input devices 152 may include additional or alternative devices or components used to adjust a parameter of the controller 100 and/or the electrostatic window 200.

In some example embodiments, the transmitter 114 and the receiver 116 are mounted to the same side of the pane unit 216. Accordingly, the sensor signal emitted by the transmitter 114 may reflect off of at least a portion of the shutter 204. The reflected sensor signal is detectable by the receiver 116. When the shutter 204 is not disposed in a path of the sensor signal, no sensor signal is reflected and/or detected by the receiver 116. The angle and magnitude of the reflected sensor signal and may be used to determine the position of the shutter 204.

The sensor system 110 may include alternative or additional components and/or devices used to detect and/or sense the motion and position of the shutter 204 to enable the controller 100 and electrostatic window 200 to function as described herein. For example, the sensor system 110 may include for example and without limitation, motion detection sensors, accelerometers, potentiometers, and the like.

Figure 3:
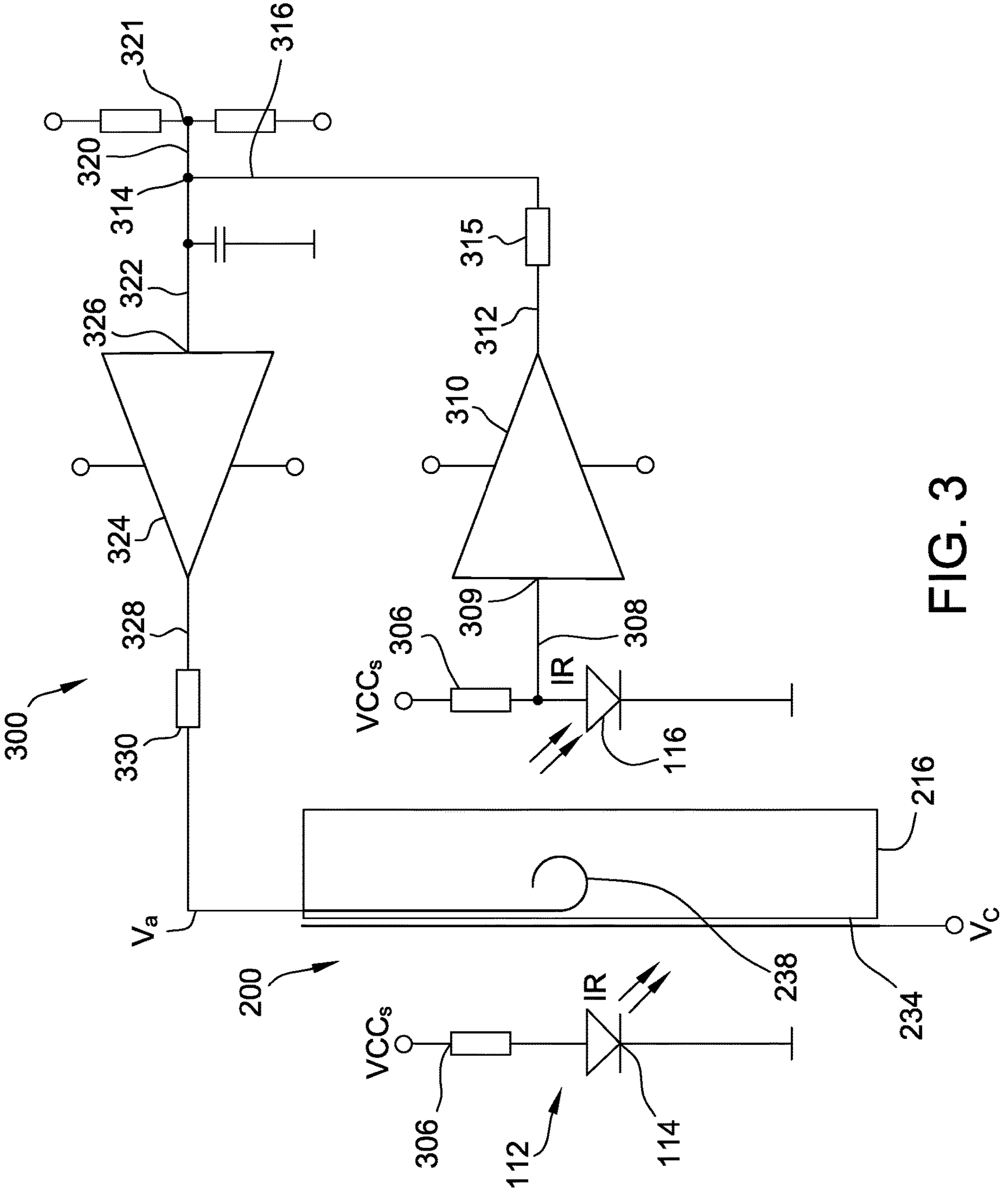
FIG. 3 is an example embodiment of a circuit diagram for the controller for use with the electrostatic window shown in FIGS. 1 and 2.

FIG. 3 illustrates an example embodiment of a controller 300 (e.g., the controller 100) for controlling the electrostatic window 200. As described above, the voltage source 106 (shown in FIG. 1) may be incorporated into the controller 300. In the example embodiment, the controller 300 is coupled to the sensor 112 including the transmitter 114 and the receiver 116 mounted on opposite sides of the pane unit 216. The transmitter 114 and the receiver 116 are coupled to a respective sensor voltage source 306 that supplies power to the associated transmitter 114 or receiver 116.

The sensor 112 detects the unfurled position of the shutter 204, and the controller 300 adjusts an electrostatic force to control the position of the shutter 204 based on feedback from the sensor 112, as described herein. More specifically, in the example embodiment, the controller 300 applies a constant voltage $V_C$ to the first electrode 234 (e.g., the first pane 220). The constant voltage $V_c$ may be in the range of, for example, −100 VDC to −400 VDC. In this example embodiment, the voltage $V_c$ is approximately −300 VDC. The controller 300 adjusts an applied voltage $V_a$ to the second electrode 238 (e.g., the the shutter 204) creating a voltage difference between voltage $V_C$ on the first electrode 234 and the voltage $V_a$ on the second electrode 238. This potential difference generates an electrostatic force that controls unfurling of the shutter 204.

The transmitter 114 and the receiver 116 receive an applied voltage $VCC_s$ from respective sensor voltage sources 306. Further, the receiver 116 includes a receiver output 308, and the voltage on the receiver output 308 depends on the signal detected by the receiver 116 and the applied voltage $VCC_s$. Specifically, when the shutter 204 is not disposed between the transmitter 114 and the receiver 116, the receiver 116 detects an undisrupted signal from the transmitter 114. When the receiver 116 detects an undisrupted signal, the receiver 116 outputs a first voltage (e.g., a low voltage) on the receiver output 308.

In contrast, when the shutter 204 is disposed between the transmitter 114 and the receiver 116, the receiver 116 detects a disrupted signal (e.g., a reduced signal or no signal). When the receiver 116 detects a disrupted signal, the receiver 116 outputs a second voltage (e.g., a high voltage) on the receiver output 308. In one example, the low voltage is approximately 30% of $VCC_s$ and the high voltage is approximately 70% of $VCC_s$.

In other words, in the example embodiment, if the sensor 112 does not detect the shutter 204, the receiver output 308 has a first voltage. In contrast, if the sensor 112 detects the shutter 204, the receiver output 308 has a second, higher voltage.

The controller 300 further includes a first amplifier 310. The first amplifier 310 includes a first amplifier input 309 coupled to the receiver output 308 and a first amplifier output 312. The first amplifier output 312 outputs the voltage on the first amplifier input 309 amplified by a first gain of the first amplifier 310. In the example embodiment, the first gain is negative. Accordingly, if the receiver output 308 is the low voltage, the voltage on the first amplifier output 312 is a high voltage (e.g., close to $VCC_s$). If, however, the receiver output 308 is the high voltage, the voltage on the first amplifier output 312 is a low voltage (e.g., close to 0 VDC).

In the example embodiment, the first amplifier output 312 is coupled to a first bias node 314 through a resistor 315. Specifically, the first bias node 314 is coupled to a first bias input 316 that is in turn coupled to the first amplifier output 312 through the resistor 315. The first bias node 314 is also coupled to a second bias input 320 and a first bias output 322. The first bias input 316, second bias input 320, and first bias output 322 are all on the same wire and accordingly have the same voltage.

The second bias input 320 is connected to a bias input node 321 that is set such that, in the absence of the sensor 112 detecting the shutter 204, a bias voltage is supplied to a second amplifier 324 such that a voltage sufficient to cause the shutter 204 to unfurl is applied to the second electrode 238.

The first amplifier output 312 controls the first bias input 316 and, accordingly, the first bias output 322 supplied to the second amplifier 324. Accordingly, changes in the voltage on the first amplifier output 312 (i.e., due to detection of the shutter 204 by the sensor 112) cause changes in the voltage supplied to the second amplifier 324. The resistor 315 limits the impact of changes in the voltage on the first amplifier output 312 and functions as part of a low pass filter (as well as causing a phase shift).

The second amplifier 324 has a second gain. In the example embodiment, the second gain is a positive gain. For example, a voltage on a second amplifier output 328 may be approximately one hundred times larger than the voltage input to the second amplifier 324 (i.e., the voltage on the first bias output 322). Notably, the voltage on the second amplifier output 328 is supplied to the second electrode 238 (i.e., via the second electrical lead 104).

Consider the example where the voltage applied to the first electrode 234 is −300 VDC. In this example, when the shutter 204 is not detected by the sensor 112, the voltage input into the first amplifier 310 is approximately 30% of $VCC_s$, the voltage output by the first amplifier 310 is approximately $VCC_s$, and the voltage output by the second amplifier is close to +300 VDC, resulting in a voltage difference between the first electrode 234 and the second electrode 238 of almost 600 VDC (causing the shutter 204 to transition towards totally unfurling). In contrast, when the shutter 204 completely blocks the sensor 112, the voltage input into the first amplifier 310 is approximately 70% of $VCC_s$, the voltage output by the first amplifier 310 is close to zero, and the voltage output by the second amplifier is close to −300 VDC, resulting in a voltage difference between the first electrode 234 and the second electrode 238 of almost zero (causing the shutter 204 to transition towards totally rolling up). Notably, when the shutter 204 only partially blocks the sensor 112, the voltage applied to the second electrode may be in a range from 0 to +300 VDC, resulting in a voltage difference between the first electrode 234 and the second electrode 238 between 300 VDC and 600 VDC. This "intermediate" voltage difference results in the shutter 204 being held at approximately the same height as the sensor 112 (e.g., between a totally unfurled and totally rolled up state).

In other words, until the sensor 112 detects the shutter 204, the voltage difference between the first electrode 234 and the second electrode 238 causes the shutter 204 to unfurl. Once the shutter 204 blocks the sensor 112, the controller 300 causes the shutter 204 to stop unfurling proximate the sensor 112.

Figure 4:
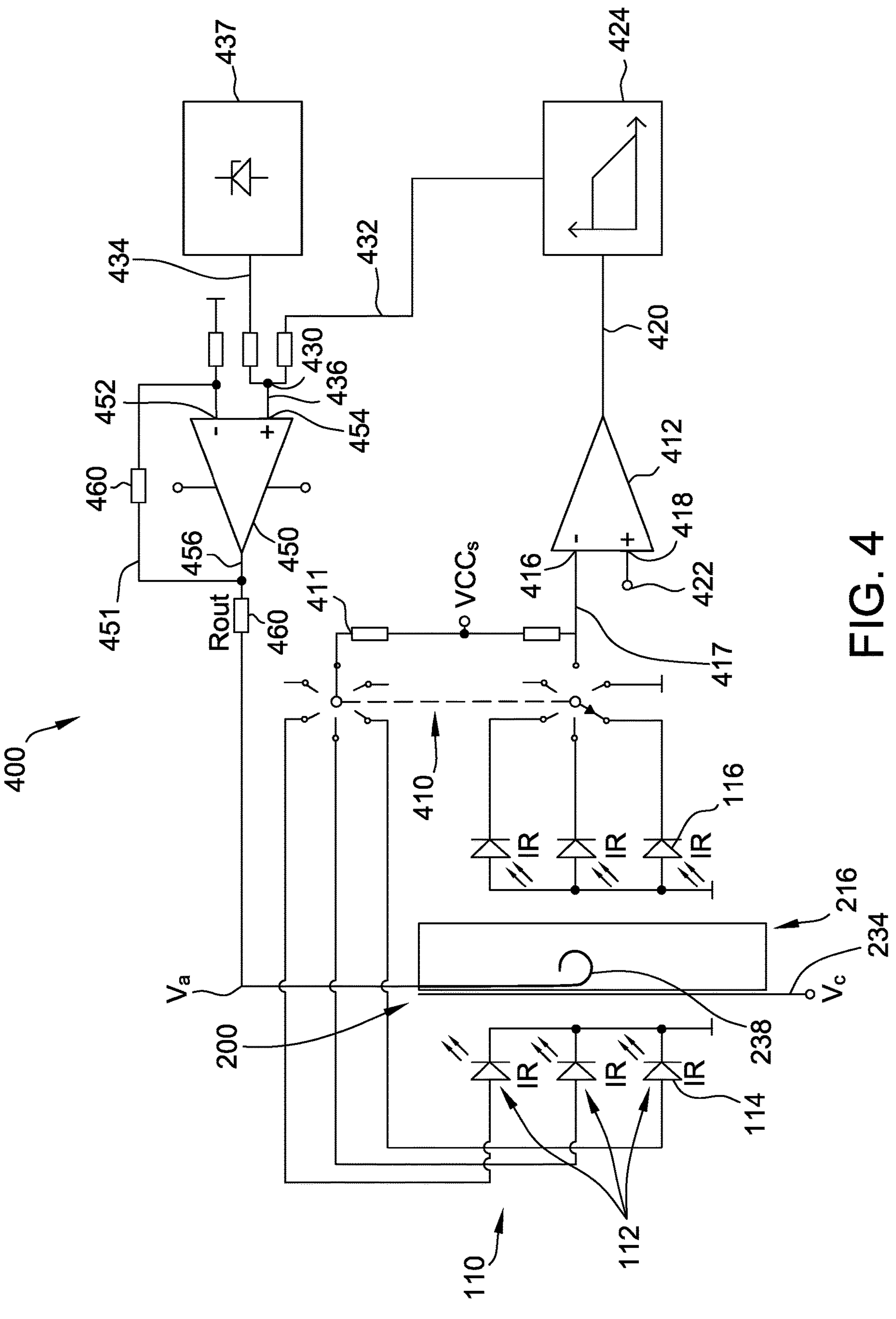
FIG. 4 is an another example embodiment of a circuit diagram of the controller for use with the electrostatic window shown in FIGS. 1 and 2.

FIG. 4 illustrates an example embodiment of a controller 400 (e.g., the controller 100) for controlling the electrostatic window 200. In the example embodiment, the controller 400 is coupled to a sensor system 110 having three sensors 112: a first sensor, a second sensor, and a third sensor, positioned at three different predetermined locations along the window axis $A_{202}$, capable of detecting the position of the shutter 204 at these predetermined locations. Each of the sensors 112 includes a transmitter 114 and a receiver 116 mounted on opposite sides of the pane unit 216 as illustrated in FIGS. 1 and 2.

The controller 400 operates similar to the controller 300 (shown in FIG. 3) to control the position of the shutter 204, based on feedback from the sensor 112. Using three sensors 112, as described herein, enables stopping unfurling of the shutter 204 at three different heights (depending on which particular sensor 112 is being used). Alternatively or additionally, the sensor system 110 may include any number of sensors 112 positioned in any number of predetermined locations.

In the illustrated embodiment, the controller 400 includes a switch 410 that selectively connects at least one sensor voltage source 411 to each of the sensors 112. The switch 410 selectively enables at least one of first, second, or third sensors 112 while disabling the remaining sensors 112. More specifically, the switch 410 may apply a voltage from sensor voltage source 411 to at least one of first, second or third sensor 112, while disconnecting any applied voltage from sensor voltage source 411 from the remaining sensors 112.

The switch 410 enables one of the sensors 112 in order to selectively set a targeted predetermined position of the shutter 204. For example, if the switch 410 enables the second sensor, while disabling the first and third sensors, the sensor system 110 is capable of detecting when the shutter 204 is at the second position. Additionally or alternatively, the switch 410 may enable the first sensor, while disabling the second sensor and third sensor, such that the sensor system 110 is capable of detecting when the shutter 204 is at the first position. Additionally or alternatively, the switch 410 may enable the third sensor while disabling the first sensor and the second sensor, such that the sensor system 110 is capable of detecting when the shutter 204 is at the third position.

Additionally, the controller 400 may transmit a signal to the switch 410 based on signals received from the user interface 150, such that the user input devices 152 may be used to select a targeted predetermined position of the shutter 204.

The controller 400 is further coupled to a first amplifier 412. The first amplifier 412 functions somewhat similar to the first amplifier 310 (shown in FIG. 3). In this embodiment, the first amplifier 412 is a comparator with a first inverting lead 416, a first non-inverting lead 418, and a first amplifier output 420. Using a comparator facilitates creating a logical voltage level on the first amplifier output 420. However, this may result in continuous back and forth movement of the shutter 204, which increases power consumption. Accordingly, in some embodiments, the first amplifier 412 is not implemented as a comparator. Alternatively, as described below, a low pass filter may be used to condition the output of the first amplifier 412.

The receivers 116 are selectively connected to a receiver output 417 through the switch 410. The first inverting lead 416 is coupled to the receiver output 417.

In this embodiment, a biasing voltage 422 supplied to the first non-inverting lead 418 sets the output voltage of the first amplifier 412 (on a first amplifier output 420) in a range from 0 to $VCC_s$. The biasing voltage also reduces the influence of sunlight (or other ambient light) on the operation of the sensor 112. Further, in this embodiment, if the shutter 204 completely blocks the sensor 112, the output voltage for the first amplifier 412 is close to 0 VDC. If the shutter 204 does not block the sensor 112, the output voltage is close to $VCC_s$. Further, if the shutter 204 partially blocks the sensor 112, the output voltage is between 0 VDC and $VCC_s$.

In some embodiments, an additional sensor (not shown) may be coupled to the first non-inverting lead 418 to reduce the influence of sunlight (and other ambient light) on the output voltage of the first amplifier 412. This additional sensor may be positioned so that the shutter 204 does not block the additional sensor (regardless of the position of the shutter 204).

The voltage on the first amplifier output 420 is input to a first filter 424, which generates an output voltage on a node first input 432. The first filter 424 is a low pass filter operable to condition the output of the first amplifier output 420.

The controller 400 further includes a first node 430 connected to the node first input 432, a node second input 434, and a node output 436. A reference source 437 is coupled to the node second input 434 and supplies a reference voltage.

The controller 400 further includes a second amplifier 450. The reference voltage shifts the voltage on a second non-inverting lead 454 of the second amplifier 450 to be in a range similar to an output voltage of the second amplifier 450.

In the example embodiment, if the output voltage of the first amplifier 412 is close to $VCC_s$ (corresponding to the shutter 204 not blocking the sensor 112), then the voltage on the second non-inverting lead 454 will be close to +3 VDC, and the output voltage of the second amplifier 450 will be close to +300 VDC (with a positive gain of a factor of one hundred). In contrast, if the output voltage of the first amplifier 412 is close to zero (corresponding to the shutter 204 totally blocking the sensor), then the voltage on the second non-inverting lead 454 will be close to −3 VDC, and the output voltage of the second amplifier 450 will be close to −300 VDC. If the shutter 204 partially blocks the sensor 112, the voltage on the second non-inverting lead 454 will be an intermediate voltage between −3 VDC and +3 VDC (which will result in the shutter 204 being held at a position proximate the sensor 112).

In the example embodiment, a second inverting lead 452 for the second amplifier 450 is coupled to the output of the second amplifier 450 via a feedback loop 451. The controller 400 may also include various resistors 460, as shown in FIG. 4.

Similar to controller 300, in controller 400, the voltage output by the second amplifier 450 is supplied to the second electrode 438 (via an output lead 456). Accordingly, the voltage output by the second amplifier 450 controls the voltage difference between the first electrode 234 and the second electrode 438, which controls the unfurling (and position) of the shutter 204.

The controller 100, 300, and/or 400 may further include one or more additional electronic components and/or devices that enable the controller 100, 300, and 400 to function as described herein. For example and without limitation, the controller 100, 300, and 400 may include one or more filters, capacitors, resistors, and the like to enable the controller 100, 300, and 400 to function as described herein.

In the example embodiments illustrated in FIG. 3 and FIG. 4, the controller 100 is implemented using one or more circuit components. Alternatively, as will be appreciated by those of skill in the art, the controller 100 may be implemented using a processor that is communicatively coupled to a memory. The memory may store a plurality of instructions that, when executed by the processor, cause the controller 100 to control a position of the shutter 204 as described above.

In some embodiments, the controller 100 is implemented on a printed circuit board (PCB). Further, in some embodiments, the controller 100 may be implemented using a high voltage flyback converter, which may facilitate reducing the size of the PCB. The controller 100 may also include a battery backup (e.g., to supply power to the controller 100 in the event of a power failure).

Figure 5:
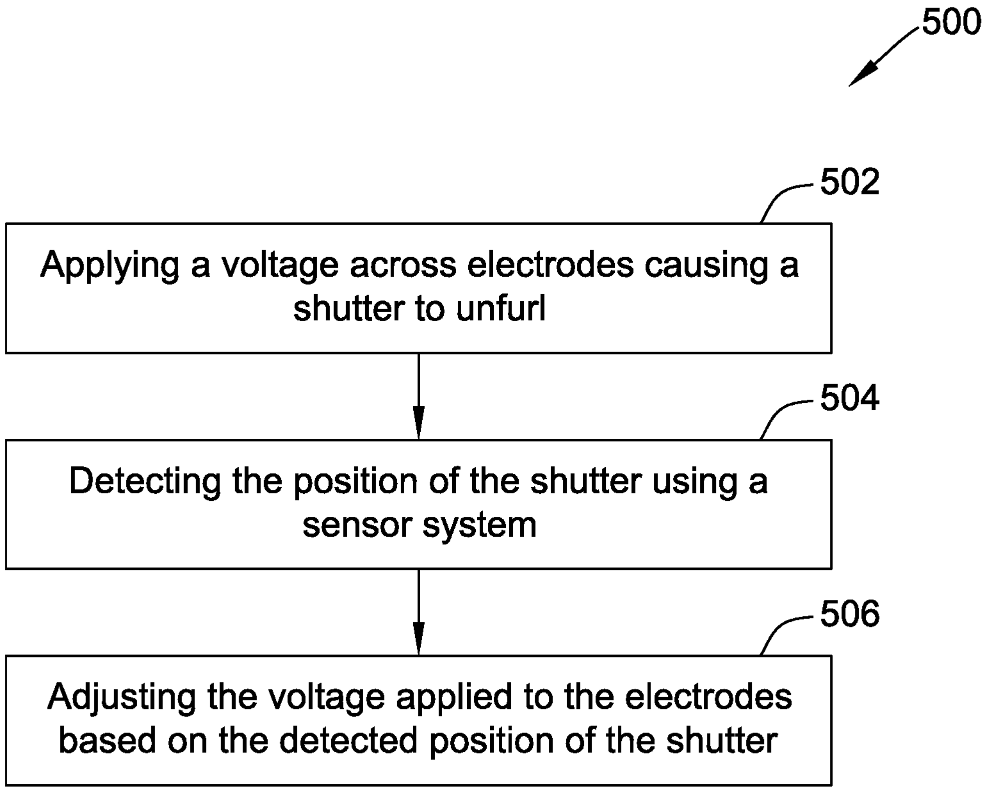
FIG. 5 is an example embodiment of a process flow diagram for controlling the position of a shutter of an electrostatic window.

FIG. 5 is a process flow chart of an example method 500 for controlling the position of a shutter of an electrostatic window (e.g., the shutter 204 of the electrostatic window 200). The method 500 may be implemented by controller 100 (e.g., controller 300 or 400), which may execute one or more operations to selectively position the shutter 204 in one or more predetermined positions.

Method 500 includes applying 502 a first voltage across the first electrode 234 and the second electrode 238. Applying 402 the first voltage includes the controller 100 causing a voltage source to apply the first voltage across the first electrode 234 and the second electrode 238. The first voltage is associated with a voltage difference between the first electrode 234 and the second electrode 238 that is required to unfurl the shutter 204 from the first configuration to the second configuration.

Method 500 further includes detecting 504 if the shutter 204 has unfurled to a predetermined position using one or more of the sensors 112. The one or more sensors 112 may be arranged to determine if the shutter 204 is in one or more unfurled positions, e.g., halfway unfurled.

One more sensors 112 may be arranged in proximity to the shutter 204 to detect the position of the shutter 204. Further, as described above, an additional sensor may be used to reduce the influence of sunlight on the system. The sensors 112 may include the transmitter 114 and the receiver 116, such that the receiver 116 detects a signal emitted by the transmitter 114. When the shutter 204 is unfurled between the transmitter 114 and the receiver 116, the sensor 112 transmits a signal to the one or more components of the controller 100 indicating that the shutter 204 is unfurled to a predetermined position.

Method 500 further includes adjusting 506 the voltage applied between the first electrode 234 and the second electrode 238 (e.g., to hold the shutter 204 at a desired position) using one or more circuit components and/or devices, as described above.

In one embodiment, if the shutter 204 is not disposed between the transmitter 114 and the receiver 116, then the controller 100 applies the first voltage across the first electrode 234 and the second electrode 238, causing the shutter 204 to unfurl. If, however, the shutter 204 is disposed between the transmitter 114 and the receiver 116, then the controller 100 applies a voltage across the first electrode 234 and the second electrode 238 that is less than the first voltage, stopping the unfurling of the shutter 204. In the example embodiment, the lower applied voltage across the first electrode 234 and the second electrode 238 holds the shutter 204 at a predetermined location without allowing the shutter 204 to roll back upward or continue to unfurl.

As used herein, the terms "about," "substantially," "essentially," and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment (s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

The invention claimed is:

1. An electrostatic shutter system comprising:
- an electrostatic shutter configured to be selectively raised and lowered based on a voltage applied to the electrostatic shutter;
- at least one sensor configured to detect when the electrostatic shutter is located at a predetermined position that is proximate the at least one sensor; and
- a controller communicatively coupled to the electrostatic shutter and the at least one sensor, the controller comprising at least one amplifier electrically coupled in series between the electrostatic shutter and the at least one sensor, the controller configured to:
  - apply an initial voltage to the electrostatic shutter to lower the electrostatic shutter;
  - receive an output signal from the at least one sensor indicating the electrostatic shutter has reached the predetermined position; and
  - based on the received output signal from the at least one sensor, apply, via the at least one amplifier electrically coupled in series between the electrostatic shutter and the at least one sensor, an updated voltage to the electrostatic shutter to hold the shutter at the predetermined position proximate the at least one sensor, wherein the updated voltage is a non-zero voltage that holds the electrostatic shutter in a partially unfurled state at the predetermined position.

2. The electrostatic shutter system according to claim 1, wherein the at least one sensor comprises:
- a transmitter positioned on a first side of the electrostatic shutter and configured to transmit a sensor signal; and
- a receiver positioned on a second side of the electrostatic shutter opposite the first side and configured to detect the sensor signal transmitted by the transmitter.

3. The electrostatic shutter system according to claim 2, wherein the transmitter and the receiver comprise an infrared transmitter and an infrared receiver, respectively.

4. The electrostatic shutter system according to claim 2, wherein the output signal indicates that the electrostatic shutter is preventing the sensor signal from reaching the receiver.

5. The electrostatic shutter system according to claim 1, wherein the at least one sensor comprises a plurality of sensors arranged at a predetermined plurality of locations relative to the electrostatic shutter.

6. The electrostatic shutter system according to claim 5, wherein one sensor of the plurality of sensors is positioned approximately halfway between a head and a sill of a window including the electrostatic shutter.

7. A control system for positioning an electrostatic shutter, the control system comprising:

at least one sensor configured to detect when the electrostatic shutter is located at a predetermined position that is proximate the at least one sensor; and a controller communicatively coupled to the at least one sensor and comprising at least one amplifier electrically coupled in series between the electrostatic shutter and the at least one sensor, wherein the controller is configured to hold the electrostatic shutter at the predetermined position that is proximate the at least one sensor by applying, via the at least one amplifier electrically coupled in series between the electrostatic shutter and the at least one sensor, an updated voltage to the electrostatic shutter when signals received from the at least one sensor indicate the electrostatic shutter is at the predetermined position, wherein the updated voltage is a non-zero voltage that holds the electrostatic shutter in a partially unfurled state at the predetermined position.

8. The control system according to claim 7, wherein the at least one sensor comprises:

a transmitter positioned on a first side of the electrostatic shutter and configured to transmit a sensor signal; and a receiver positioned on a second side of the electrostatic shutter opposite the first side and configured to detect the sensor signal transmitted by the transmitter.

9. The control system according to claim 8, wherein the transmitter and the receiver comprise an infrared transmitter and an infrared receiver, respectively.

10. The control system according to claim 9, wherein the output signal indicates that the shutter is preventing the sensor signal from reaching the infrared receiver.

11. The control system according to claim 7, wherein the at least one sensor comprises a plurality of sensors arranged at a predetermined plurality of locations relative to the electrostatic shutter.

12. The control system according to claim 11, wherein one sensor of the plurality of sensors is positioned approximately halfway between a head and a sill of a window including the electrostatic shutter.

13. A method for positioning an electrostatic shutter, the method comprising:

applying an initial applied voltage to the electrostatic shutter to lower the electrostatic shutter;

receiving, at a controller including at least one amplifier electrically coupled in series between the electrostatic shutter and at least one sensor, an output signal from the at least one sensor, wherein the at least one sensor detects when the shutter is located at a predetermined position proximate the sensor; and based on the received output signal, applying, via the at least one amplifier electrically coupled in series between the electrostatic shutter and the at least one sensor, an updated applied voltage to the electrostatic shutter to hold the shutter at the predetermined position proximate the sensor, wherein the updated voltage is a non-zero voltage that holds the electrostatic shutter in a partially unfurled state at the predetermined position.

14. The method according to claim 13, wherein receiving an output signal comprises receiving an output signal from at least one sensor including:

a transmitter positioned on a first side of the electrostatic shutter and configured to transmit a sensor signal; and a receiver positioned on a second side of the electrostatic shutter opposite the first side and configured to detect the sensor signal transmitted by the transmitter.

15. The method according to claim 14, wherein the transmitter and the receiver include an infrared transmitter and an infrared receiver, respectively.

16. The method according to claim 14, wherein receiving an output signal comprises receiving an output signal that indicates that the electrostatic shutter is preventing the sensor signal from reaching the receiver.

17. The method according to claim 13, wherein receiving an output signal comprises receiving a plurality of output signals from a plurality of sensors arranged at a predetermined plurality of locations relative to the electrostatic shutter.

18. The method according to claim 17, wherein one sensor of the plurality of sensors is positioned approximately halfway between a head and a sill of a window including the electrostatic shutter.

19. The method according to claim 17, wherein one sensor includes a proximity sensor.

20. The method according to claim 17, the method further comprising:

receiving a user input from at least one user input device that identifies the predetermined position for the electrostatic shutter to be held at.

* * * * *